US010997456B2

(12) United States Patent
Vootukuru (10) Patent No.: US 10,997,456 B2
(45) Date of Patent: May 4, 2021

(54) TWO DIMENSIONAL HILBERT HUANG TRANSFORM REAL-TIME IMAGE PROCESSING SYSTEM WITH PARALLEL COMPUTATION CAPABILITIES

(71) Applicant: Madhavi Vootukuru, Mc Lean, VA (US)

(72) Inventor: Madhavi Vootukuru, Mc Lean, VA (US)

(73) Assignee: Syneren Technologies Corporation, Arlington, VA (US)

( * ) Notice: Subject to any disclaimer, the term of this patent is extended or adjusted under 35 U.S.C. 154(b) by 181 days.

(21) Appl. No.: 14/999,042

(22) Filed: May 11, 2015

(65) Prior Publication Data
US 2018/0204086 A1    Jul. 19, 2018

(51) Int. Cl.
| | | |
|---|---|---|
| *G06K 9/46* | (2006.01) | |
| *G06T 1/20* | (2006.01) | |
| *G06K 9/62* | (2006.01) | |

(52) U.S. Cl.
CPC ......... *G06K 9/4633* (2013.01); *G06K 9/4642* (2013.01); *G06K 9/6265* (2013.01); *G06T 1/20* (2013.01)

(58) Field of Classification Search
CPC .. G06K 9/4633; G06K 9/6265; G06K 9/4642; G06T 1/20
See application file for complete search history.

(56) References Cited

U.S. PATENT DOCUMENTS

| | | | | |
|---|---|---|---|---|
| 6,738,734 | B1 * | 5/2004 | Huang | G06F 17/14 702/179 |
| 8,428,389 | B2 * | 4/2013 | Pao | G06T 7/0012 382/100 |
| 9,013,490 | B2 | 4/2015 | Kizhner | |
| 2008/0253625 | A1 * | 10/2008 | Schuckers | G06K 9/00114 382/125 |
| 2012/0101781 | A1 * | 4/2012 | Chen | G06F 17/14 702/189 |
| 2013/0307858 | A1 * | 11/2013 | Kizhner | G06T 5/20 345/501 |

OTHER PUBLICATIONS

Chen et al. ("GPGPU-Aided Ensemble Empirical-Mode Decomposition for EEG Analysis During Anesthesia", IEEE, vol. 14, No. 6, 2010); (Year: 2010).*

(Continued)

*Primary Examiner* — Samantha (Yuehan) Wang
*Assistant Examiner* — Khoa Vu
(74) *Attorney, Agent, or Firm* — Justin T. Darrow (57) ABSTRACT

An apparatus, computer program product and method of analyzing two-dimensional data input. The system is known as Syneren Signal and Image Enhancement Technology (SIETECH). SIETECH can be implemented in software or in Field Programmable Gate Array (FPGA) hardware. Some embodiments of the present invention pertain to apparatuses, method, and a computer program that is configured to cause the central processor to pass the input data to the multi-thread processors, wherein each data point is mapped on the thread level and the local lower and upper bounds are constructed simultaneously based on order statistic window.

20 Claims, 6 Drawing Sheets

(56) References Cited

OTHER PUBLICATIONS

Kenneth Richard Bundy "The Hilbert-Huang Transform_A Theoretical Framework and Application To Leak Indetification in pressurized space modules" Uninversity of Maine, 2014 (Year: 2014).*
Oracle, "Performance Overview," Oracle Application Server Performance Guide, 2005, 7 pages, 10g Release 2 (10.1.2). http://web.deu.edu.tr/doc/oracle/B14099_16/core.1012/b14001/overview.htm#i1004703.
Oxford Dictionary of English (3 ed.), "Zero Crossing," Oxford University Press, 2010, 2 pages, https://www.oxfordreference.com/view/10.1093/acref/9780199571123.001.0001/m_en_gb0969860?rskey=IdaA3R&result=5.
William R. Wade, An Introduction to Analysis, Fourth Edition, 2010, pp. 188, 189, 198, 199, 227, 228. Pearson Prentice Hall, Upper Saddle River, NJ, USA.
The Editors of Encyclopaedia Britinnica, "Convergence," Encyclopaedia Britannica, Encyclopaedia Britinica, Inc., Mar. 12, 2020, 1 page, https://www.britannica.com/science/convergence-mathematics.
The MathWorks, Inc., "Estimate Computation Costs," MATLAB & Simulink, 2020, 2 pages, https://www.mathworks.com/help/physmod/simscape/ug/estimate-computation-costs.html.

\* cited by examiner

TWO DIMENSIONAL HILBERT HUANG TRANSFORM REAL-TIME IMAGE PROCESSING SYSTEM WITH PARALLEL COMPUTATION CAPABILITIES

NAMES OF PARTIES TO A JOINT RESEARCH AGREEMENT

National Aeronautics and Space Administration Goddard Space Flight Center, Syneren Technologies Corporation, and Madhavi "Meg" Vootukuru.

FIELD

The present invention is generally related to data analysis method and apparatus for extracting and physical meaningful layers of information from non-stationary and non-Gaussian data. It is understood that the invention is applicable for all two dimensional data sets, not limited to image matrices, in which this invention finds utility in separating and extracting layers of information and noises. It should also be noted that the proposed invention is capable of processing stationary and Gaussian data sets while it presents superiority in handling the non-stationary and non-Gaussian data.

BACKGROUND

Data analysis is indispensable for both research and industry use to release hidden information. Traditional data analysis method such as Fourier Transform (FT) and Wavelet Transform (WT) are only capable of processing linear and stationary signals. The corresponding spectrum result does not provide much insight into the physical meaning. Very often, the real world collected data is non-stationary and corrupted by noises, for which FT and WT are unable to deliver insightful result. Compared to the traditional data processing techniques, the Hilbert Huang Transform (HHT) conforms better to the local features of input signals and displays its capabilities in processing non-linear and non-stationary signals. The Hilbert Huang Transform is divided into two major parts: Empirical Mode Decomposition (EMD) and Hilbert Spectrum Analysis (HSA). In the EMD step, input signals are decomposed into a finite and small number of arbitrary components called Intrinsic Mode Functions (IMFs). IMFs are computed from sequential iterations on upper and lower envelopes of the input signals. In Hilbert Spectrum Analysis, the simple and oscillatory IMFs are further processed by the Hilbert Transform. Up to this date, the application of Hilbert Huang Transform is limited to research fields and is used either on one dimensional signals or small size two dimensional signals. Computation complexity in building the upper and lower envelopes for IMF extraction is the main reason preventing HHT2 from being used for practical applications.

SUMMARY

Certain embodiments of this invention may provide solutions to time complexity and stoppage determination of existing 2-D Hilbert Huang Transform.

In one embodiment, a computer program is implemented on a computer-readable storage medium and a multi-thread processing unit storage medium. When executed, the computer program is configured to cause the central processor to read the input data and pass it to the multi-thread processors. Data points are associated to computational threads that in turn perform a simultaneous construction of the local lower and upper envelopes and decide the number of EMD interactions on the multithread processor.

In another embodiment, a computer-implemented method includes passing the input image to the multi-thread processors at thread level, constructing the local lower and upper envelopes simultaneously, and determine the how many interactions of EMD should be executed.

In yet another embodiment, an apparatus includes physical memories including a computer program, and central processors and multi-thread processors coupled to the corresponding memories. The computer-implemented method is configured to cause the central processor to load the input data to the multi-thread processors at thread level, wherein the local lower and upper envelopes are constructed simultaneously and the interactions of EMD are determined accordingly.

BRIEF DESCRIPTIONS OF THE DRAWING

In order that the advantages of certain embodiments of the invention will be readily understood, a more particular description of the invention briefly described above will be rendered by reference to specific embodiments that are illustrated in the appended drawings. While it should be under stood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

It will be readily understood that the components of the present invention, as generally described and illustrated in the figures herein, may be arranged and designed in a wide variety of different configurations. Thus, the following detailed description of the embodiments of an apparatus, a system, a method, and a computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

One or more embodiments of the present invention pertain to a reference HHT Empirical Mode Decomposition for 2-D (EMD2) algorithms that require high capability computing, and an introduction to HHT2 spectrum concepts.

The primary motivation is the need for the development of accelerated parallelized HHT2 is to develop a real-time HHT2 tool for processing large size images, which may contain non-linear and non-stationary information. The goal is to accelerate the entire process to derive result in a useful manner.

The main problem in developing HHT2 is its high computational complexity and expenses in building the envelopes and repeated tests of stoppage criteria. Assuming the image size is N×N and n interactions of test is conducted when the first IMF is extracted, the computational complexity is estimated as $nO(N^4)$.

Another problem with Hilbert Huang Transform is the boundary effect. Failure to determine proper behavior of the boundary points will lead to the generation of meaningless IMF components. For example, some 2D HHT methods construct the upper and lower bounds based on the spline function. The overall shape of the spline varies as the boundary points vary, which in turn results in unpredictable possible sets of Intrinsic Mode Function (IMF). Thus, dividing input signals into subsets of smaller size to conduct real-time process separately may not be sufficient as different ways of separating the input signal results in different boundary effects, which increase the uncertainties in the lower and upper envelopes of the IMFs. Conversely, applying the thread level parallelism reduces the computational complexities without introducing extra boundary effects. The proposed HHT2 is independent from HHT1 and take the local input from both directions to build the lower and upper envelopes. Each data point from the input signal is mapped at thread level and communicates with neighbor points within the order statistic window. Apparatuses such as GPU can be used to realize the thread level separation.

Figure 1:
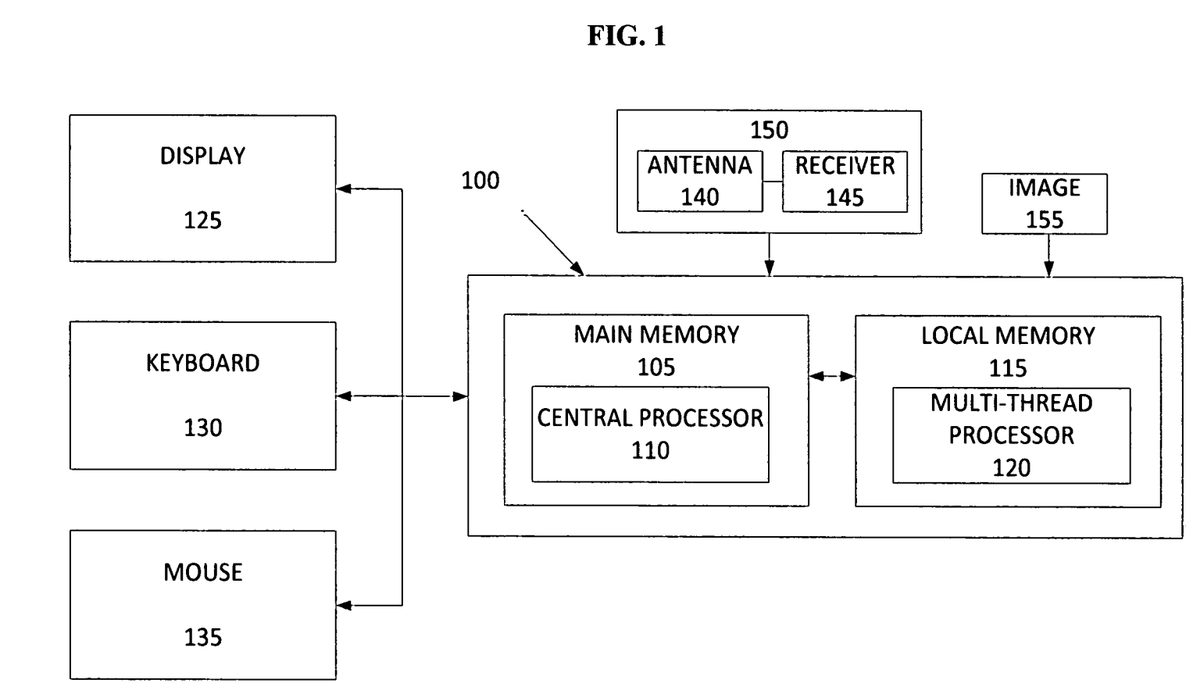
FIG. 1 illustrates a block-diagram of a real-time Hilbert Huang Transform with parallel processing capabilities, according to an embodiment of the present invention.

FIG. 1 illustrates a block diagram example of a real-time data processing system 100 with 2-D capabilities. System 100 may include main memory 105 to store and communicate information inside the centralized processor 110. Main memory 105 also stores and communicates the transitional information between the centralized processor 110 and multi-thread processor 120. Processor 110 can be any type of general or specific purpose processor. Processor 120 can be any type of processor embedded with multi threads. GPU is a good example for 120. The multi-thread processor takes the data stored in local memory 115 and conduct the majority of the algorithm at a parallelized level.

The computer-readable medium may be any available media that can be accessed by processor 110. The computer-readable medium may include both volatile and nonvolatile medium, removable and non-removable media, and communication media. The communication media may include computer-readable instructions, data structures, program modules, or other data and may include any information delivery media.

Processor 110 can be coupled to a display 125, such as a Liquid Crystal Display ("LCD"). Display 125 may display information to the user. System 100 may also include a keyboard 130 and a cursor control unit 135, e.g. a computer mouse, for human interactions. System 100 can also include an input device 140 or an image device 145. The input device 140 may include an antenna 150 and a receiver 155 for receiving non-stationary and non-linear data, for example, from a satellite collecting geospatial data. System 100 may also include a keyboard 130 and a cursor control unit 135, such as a computer mouse for human interactions.

Figure 2:
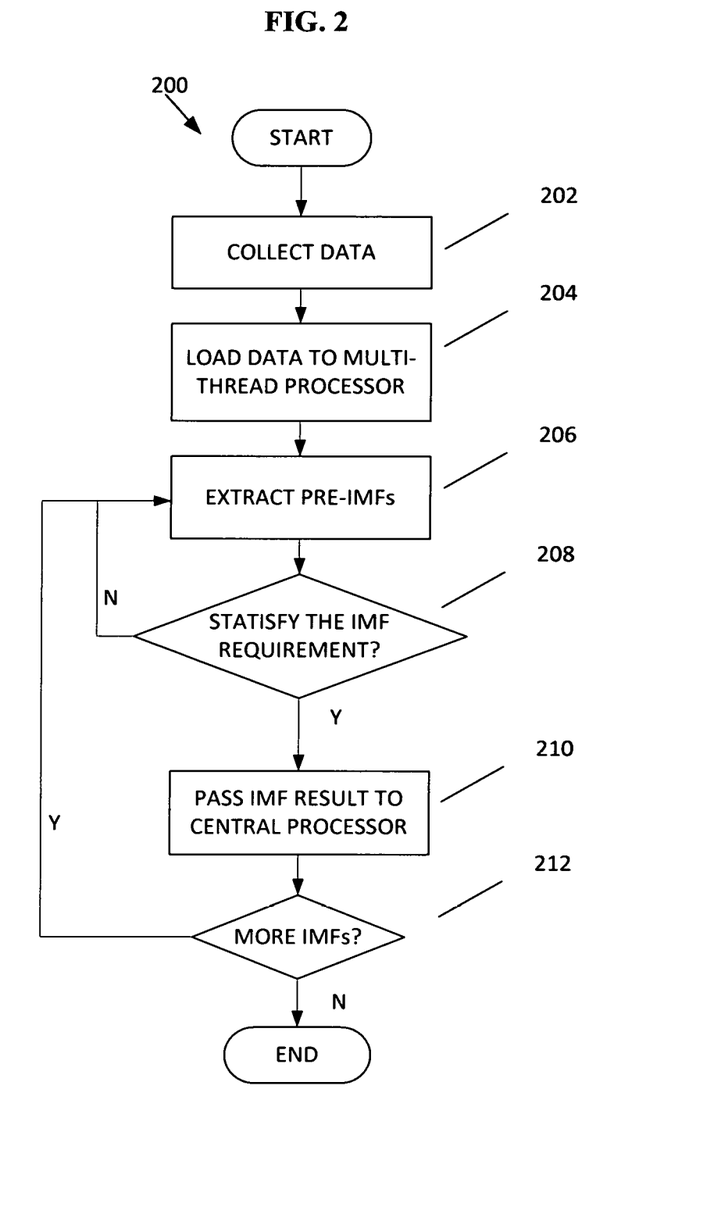
FIG. 2 illustrates an accelerated Hilbert Huang Transform with 2-D capabilities, according to an embodiment of the present invention.

FIG. 2 illustrates the parallelized Hilbert Huang Transform method 200 with 2-D capabilities. The method of FIG. 2 may be executed by, for example, the computing system shown in FIG. 1.

In order to initialize the method of FIG. 2, a main script can be invoked to cause the processor to initialize the system parameters {N, M, Δs}. N is the input image width while M is the input image length, and Δs is the threshold to decide whether the IMF requirement is met. At 202, the system parameters are initialized and input data are read. At 204, the input data along with the parameters is passed to the multi-thread processor, where corresponding memory is allocated and the data point is assigned at the thread level. Once the data point is assigned to the thread, the thread will optimize the building of the extrema and generate the pre-IMFs accordingly. Step 206 is called sifting process. The IMF candidate (pre-IMF) will be tested against the IMF requirements to decide whether it can be output as an IMF result. If the requirements are satisfied, the multi-thread processor will output the IMF and pass it to central processor to display.

Figure 3A:
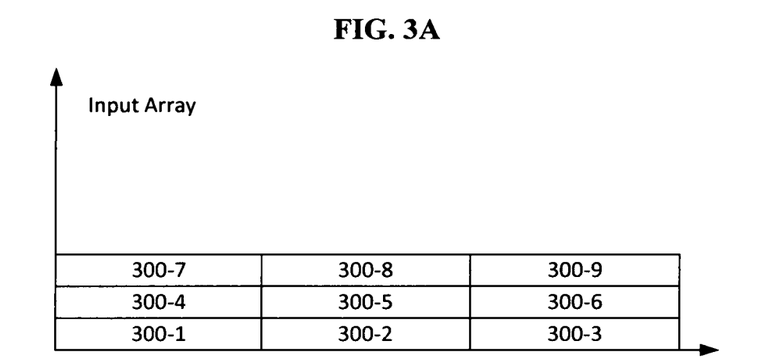
FIG. 3A illustrates the thread allocation mapping to the input data matrix.
Figure 3B:
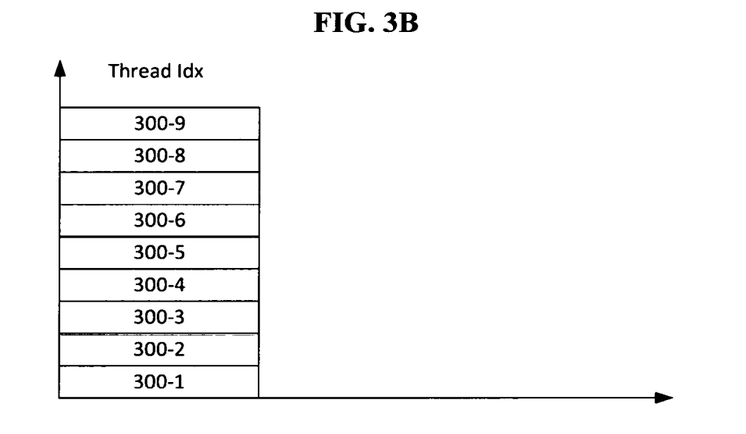
FIG. 3B illustrates the assignment of the input array to the thread on the multi-thread processor when the size of the dataset does not exceed the maximum number of the threads.

FIG. 3B illustrates the assignment of the input array to the thread on the multi-thread processor when the size of the dataset does not exceed the maximum number of the threads. Take GPU for example. The largest dataset size GPU can take into is $2^{16}-1$. If the dataset size is larger than the maximum thread number, separating the input data into smaller subsets is required. FIG. 3A illustrates the input array read by the conventional serial method while FIG. 3B illustrates the remapped computation on the individual thread. The thread index (Thread.Idx) and input indices (Array.rowIdx and Array.colIdx) holds the following relationship:

Thread.Idx=rows×Array.rowIdx+Array.colIdx

Figure 4:
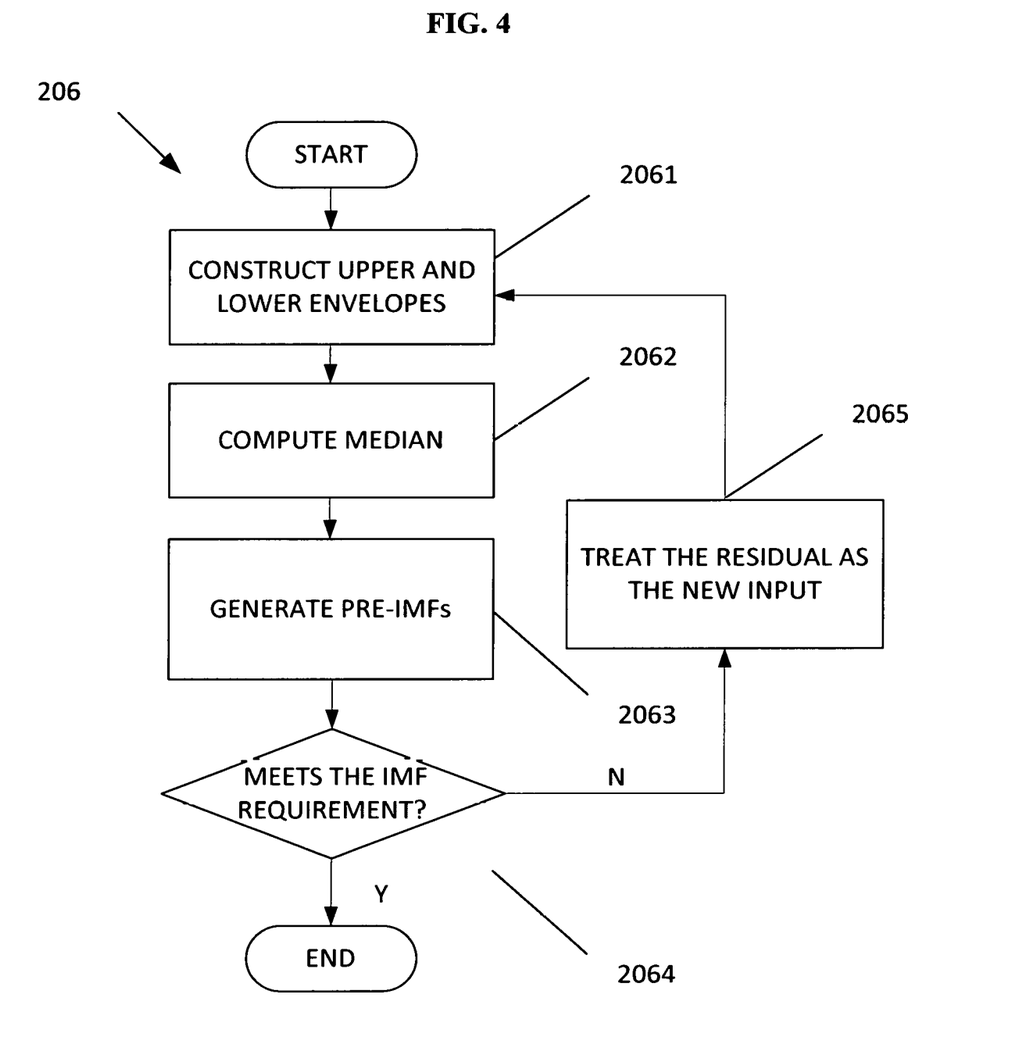
FIG. 4 illustrates a method of extracting IMF candidates, which is called sifting process, according to an embodiment of the present invention.

FIG. 4 illustrates a method to realize the sifting process 206. The input signal $h_{k-1}(x, y)$, the upper envelope $u_k(x, y)$, and lower envelope $l_k(x, y)$, and the IMF candidate $h_k(x, y)$ should hold the relationship as:

$$h_{k-1}(x, y) - h_k(x, y) = \frac{u_k(x, y) + l_k(x, y)}{2}$$

Figure 5:
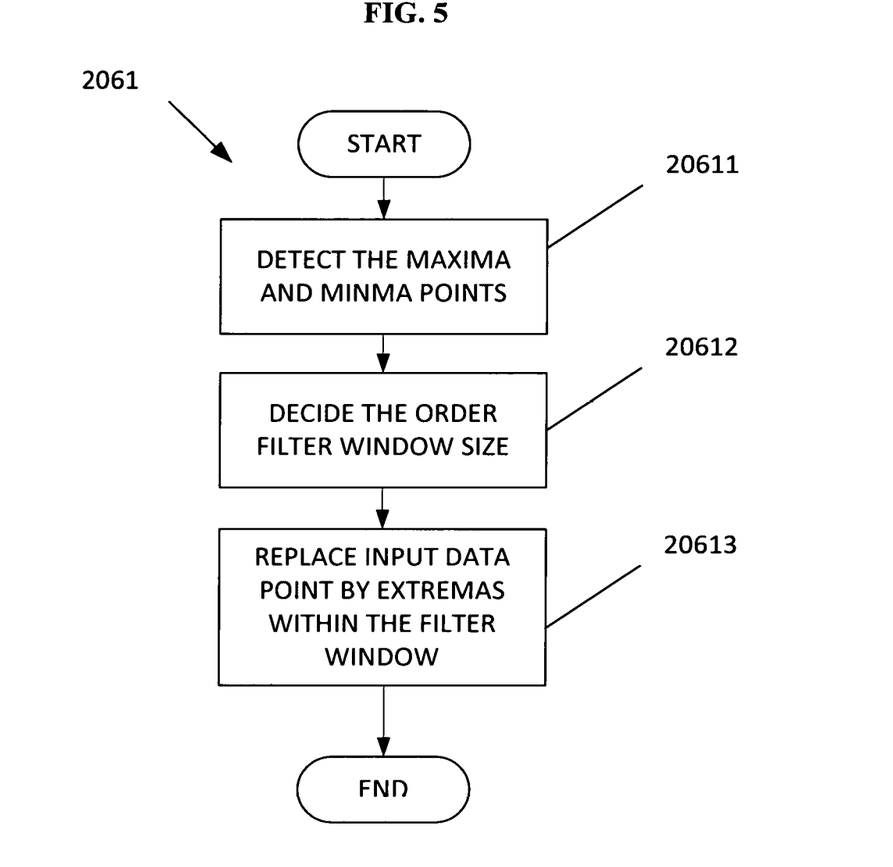
FIG. 5 illustrate a method of deciding the order filter window size and building corresponding upper and lower envelopes, according to an embodiment of the present invention.

FIG. 5 illustrates a method for optimizing the determination of upper and lower envelopes, according to an embodiment of the present invention. The method of FIG. 5 may be executed by, for example, the computing system of FIG. 1.

At 20611, the method detects the local maxima and minima under a predefined definition of extreme. For example, two mutually perpendicular sliding windows may be used to decide the local extremas.

At 20612, the calculation of the distance among the maximas and minimas are conducted. The distance calculated will be utilized to decide the order filter window size. The window size may be decided in the equations as follows:

$$w=d_1=\min\{\min\{d_{max}\},\min\{d_{min}\}\}$$

$$w=d_2=\max\{\min\{d_{max}\},\min\{d_{min}\}\}$$

$$w=d_3=\min\{\max\{d_{max}\},\max\{d_{min}\}\}$$

$$w=d_4=\max\{\max\{d_{max}\},\max\{d_{min}\}\}$$

Figure 6:
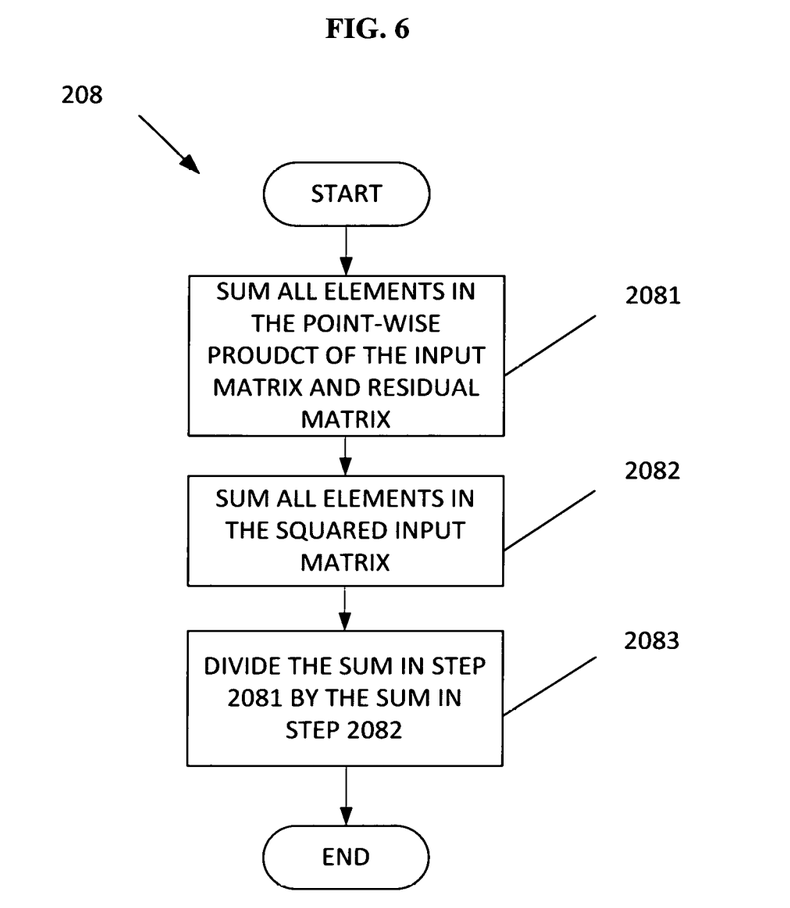
FIG. 6 illustrate a method of testing whether IMF candidate satisfies the requirement for IMF, according to an embodiment of the present invention.

$d_m$—Matrix of distance among the maximas
$d_{min}$—Matrix of distance among the minimas The average calculation complexity of deciding the distance among the extremas in this process is $O(N^4)$ when the input array is a squared matrix with side N. The window size w may be decided by diving the total element number by the extrema number to improve the computation efficiency, FIG. 6 illustrates how the process decide whether the IMF candidate is good or not. Theoretically, the IMF should satisfy the IMF requirement: 1. The number of the zero crossings 2. The median of the IMF should be close to zero. To accomplish this, a criterion similar to Cauchy converges test is applied as follows:

$$SD_k = \frac{\sum_{y=0}^{M}\sum_{x=0}^{N}|h_{k-1}(x,y)-h_k(x,y)|^2}{\sum_{y=0}^{M}\sum_{x=0}^{N}h_{k-1}^2(x,y)}$$

k—the kth interaction of sifting
$h_{k-1}(t)$—the input signal for the kth interaction
$h_k(t)$—the IMF candidate for the kth interaction In this stop criterion evaluation process, instead of conducting the sequential computation of the squared result, the summation process is conducted by the optimized parallel process. For example, the tree based summation has the same time complexity as the sequential method but eliminate the waiting time for the other data point to be processed. A binary tree may be applied to realize the computation cost reduction.

What is claimed is:

1. A computer program embodied on a non-transitory computer-readable medium, the computer program, when executed on a system, configured to cause the system to:
read input data via central processor;
set the input data as an input signal;
perform a sifting process interaction comprising:
passing the input signal to a multi-thread processor;
causing the multi-thread processor to construct an upper envelope and a lower envelope for the input signal;
detecting local maxima of the upper envelope and local minima of the lower envelope;
calculating distances among the local maxima and the local minima;
generating an Intrinsic Mode Function (IMF) candidate by subtracting a mean of the upper envelope and the lower envelope from the input signal;
calculating a standard deviation from a sum of a number of series terms of normalized squares of differences between the input signal and the IMF candidate, at points at the distances apart from one another, the points extending from a center of the input signal outward toward a boundary of the input signal;
determining whether the standard deviation converges to zero or not with an increase in the number of series terms;
if the standard deviation is determined not to converge to zero with an increase in the number of series terms, set the IMF candidate as the input signal;
repeat performing the sifting process interaction until determining that the standard deviation does converge to zero with an increase in the number of series terms;
when the standard deviation is determined to converge to zero with an increase in the number of data points, display the IMF candidate.

2. The computer program of claim 1, wherein the computer program is further configured to cause the multi-thread processor to allocate the input signal at thread level and construct the one by one relationship between a data point of the input signal and a thread.

3. The computer program of claim 1, wherein the computer program is further configured to cause the multi-thread processor to generate a local map of extrema based on the input signal.

4. The computer program of claim 3, wherein the computer program is further configured to cause the multi-thread processor to generate local maps of extrema based on the input signal, and a local extrema detection algorithm.

5. The computer program of claim 1, wherein the computer program is further configured to cause the multi-thread processor to determine when to stop extracting a median from the input signal.

6. The computer program of claim 1, wherein the computer program is further configured to cause the system to:
optimize the parallel processing with tree based summation to calculate the standard deviation; and
eliminate waiting time for a data point in the standard deviation to be processed with the tree based summation.

7. The computer program of claim 1, wherein the computer program is further configured to cause the system to:
optimize the parallel processing with binary tree based summation to calculate the standard deviation; and
reduce computation cost to calculate the standard deviation with the binary tree based summation.

8. A computer-implemented method, comprising:
reading input data via a central processor
setting the input data as an input signal;
performing a sifting process interaction comprising:
passing the input signal to a multi-thread processor;
causing the multi-thread processor to construct an upper envelope and a lower envelope for the input signal;
detecting local maxima of the upper envelope and local minima of the lower envelope;
calculating distances among the local maxima and local minima;
generating an Intrinsic Mode Function (IMF) candidate by subtracting a mean of the upper envelope and the lower envelope from the input signal;
calculating a standard deviation from a sum of a number of series terms of normalized squares of differences between the input signal and the IMF candidate, at points at the distances apart from one another, the points extending from a center of the input signal outward toward a boundary of the input signal; and determining whether the standard deviation converges to zero or not with an increase in the number of series terms;

if the standard deviation is determined not to converge to zero with an increase in the number of series terms, setting the IMF candidate as the input signal;

repeating performing the sifting process interaction until determining that the standard deviation does converge to zero with an increase in the number of series terms;

when the standard deviation is determined to converge to zero with an increase in the number of series terms, display the IMF candidate.

9. The computer-implemented method of claim 8, further comprising: allocating the input data at the thread level and constructing the one by one relationship between a data point of the input signal and a thread.

10. The computer-implemented method of claim 8, further comprising: generating a local map of extrema based on the input signal on the multi-thread processor.

11. The computer-implemented method of claim 10, further comprising: generating local maps of extrema based on the input signal, a local extrema detection algorithm, and an embedded frame.

12. The computer-implemented method of claim 8, further comprising: determining when to stop extracting a median from the input signal.

13. The computer-implemented method of claim 8, further comprising:

optimizing the parallel processing with tree based summation in the step of calculating the standard deviation; and eliminating waiting time for a data point in the standard deviation to be processed with the tree based summation.

14. The computer-implemented method of claim 8, further comprising:

optimizing the parallel processing with binary tree based summation to calculate the standard deviation; and reducing computation cost computation cost with the binary tree based summation.

15. An apparatus, comprising:

physical main memory and local memory comprising a computer program; and a central processor coupled to the main memory while a multi-thread processor is coupled to the local memory, wherein the computer program is configured to cause the apparatus to:

read input data via the central processor;

set the input data as an input signal;

perform a sifting process interaction comprising:
passing the input signal to the multi-thread processor;
causing the multi-thread processor to construct an upper envelope and a lower envelope for the input signal;

detecting local maxima of the upper envelope and local minima of the lower envelope;

calculating distances among the local maxima and the local minima;

generating an Intrinsic Mode Function (IMF) candidate by subtracting a mean of the upper envelope and the lower envelope from the input signal;

calculating a standard deviation from a sum of a number of series terms of normalized squares of differences between the input signal and the IMF candidate, at points at the distances apart from one another, the points extending from a center of the input signal outward toward a boundary of the input signal;

determining whether the standard deviation converges to zero or not with an increase in the number of series terms;

if the standard deviation is determined not to converge to zero with an increase in the number of series terms, set the IMF candidate as the input signal;

repeat performing the sifting process interaction until determining that the standard deviation does converge to zero with an increase in the number of series terms;

when the standard deviation is determined to converge to zero with an increase in the number of data points, display the IMF candidate.

16. The apparatus of claim 15, wherein the computer program is further configured to cause the multi-thread processor to allocate the input signal at the thread level and construct the one by one relationship between a data point of the input signal and a thread.

17. The apparatus of claim 15, wherein the computer program is further configured to cause the multi-thread processor to generate a local map of extrema based on the input signal.

18. The apparatus of claim 15, wherein the computer program is further configured to cause the multi-thread processor to determine when to stop extracting median from the input signal.

19. The apparatus of claim 15, wherein the computer program is further configured to cause the apparatus to:

optimize the parallel processing with tree based summation to calculate the standard deviation; and eliminate waiting time for a data point in the standard deviation to be processed with the tree based summation.

20. The apparatus of claim 15, wherein the computer program is further configured to cause the system to:

optimize the parallel processing with binary tree based summation to calculate the standard deviation; and reduce computation cost to calculate the standard deviation with the binary tree based summation.

* * * * *